(12) United States Patent
Kilian et al.

(10) Patent No.: US 8,073,108 B2
(45) Date of Patent: Dec. 6, 2011

(54) X-RAY GENERATOR AND THE USE THEREOF IN AN X-RAY EXAMINATION DEVICE OR X-RAY INSPECTION DEVICE

(75) Inventors: Karl-Heinz Kilian, Oestrich-Winkel (DE); Joerg Bermuth, Rockenberg (DE); Georg Geus, Wiesbaden (DE)

(73) Assignee: Smiths Heimann GmbH, Wiesbaden (DE)

( * ) Notice: Subject to any disclaimer, the term of this patent is extended or adjusted under 35 U.S.C. 154(b) by 0 days.

(21) Appl. No.: 12/845,229

(22) Filed: Jul. 28, 2010

(65) Prior Publication Data

US 2010/0290588 A1 Nov. 18, 2010

Related U.S. Application Data

(63) Continuation of application No. PCT/EP2008/009300, filed on Nov. 5, 2008.

(30) Foreign Application Priority Data

Jan. 29, 2008 (DE) .......................... 10 2008 006 620

(51) Int. Cl.
*H01J 35/18* (2006.01)
*H01J 35/16* (2006.01)
*H01J 35/02* (2006.01)

(52) U.S. Cl. ........................ 378/121; 378/161
(58) Field of Classification Search ................. 378/121, 378/161
See application file for complete search history.

(56) References Cited

U.S. PATENT DOCUMENTS

| | | | | |
|---|---|---|---|---|
| 3,691,417 A * | 9/1972 | Gralenski | ...................... | 378/136 |
| 4,053,802 A * | 10/1977 | Hartl | .............................. | 313/256 |
| 5,627,871 A * | 5/1997 | Wang | ............................. | 378/121 |
| 5,844,962 A | 12/1998 | Kunert | | |
| 5,854,822 A * | 12/1998 | Chornenky et al. | ........... | 378/122 |
| 6,188,747 B1 | 2/2001 | Geus et al. | | |
| 6,385,294 B2 * | 5/2002 | Suzuki et al. | .................. | 378/136 |
| 6,415,016 B1 | 7/2002 | Chornenky et al. | | |
| 6,567,500 B2 * | 5/2003 | Rother | ......................... | 378/140 |
| 6,570,962 B1 * | 5/2003 | Maska et al. | ................... | 378/140 |
| 7,058,161 B2 * | 6/2006 | Inazuru et al. | ................. | 378/143 |
| 7,127,034 B1 * | 10/2006 | Lee et al. | ........................ | 378/131 |
| 7,218,707 B2 * | 5/2007 | Holm | ............................. | 378/121 |
| 7,236,568 B2 * | 6/2007 | Dinsmore et al. | ............. | 378/139 |
| 7,236,569 B2 * | 6/2007 | Takeuchi et al. | .............. | 378/139 |
| 7,382,862 B2 * | 6/2008 | Bard et al. | ..................... | 378/121 |
| 2002/0063500 A1 | 5/2002 | Keren | | |
| 2005/0002491 A1 | 1/2005 | Lenz | | |

FOREIGN PATENT DOCUMENTS

| | | |
|---|---|---|
| DE | 196 08 862 A1 | 9/1997 |
| DE | 198 02 668 A1 | 7/1999 |
| DE | 103 20 700 A1 | 2/2004 |
| WO | WO 01/18842 A1 | 3/2001 |
| WO | WO 2005/055270 A1 | 6/2005 |

* cited by examiner

*Primary Examiner* — Allen C. Ho
(74) *Attorney, Agent, or Firm* — Muncy, Geissler, Olds & Lowe, PLLC

(57) ABSTRACT

An X-ray generator having a housing and having components located inside the housing for generating one or more X-ray beams, wherein the housing is composed of a tube body that is made of ceramic.

17 Claims, 1 Drawing Sheet

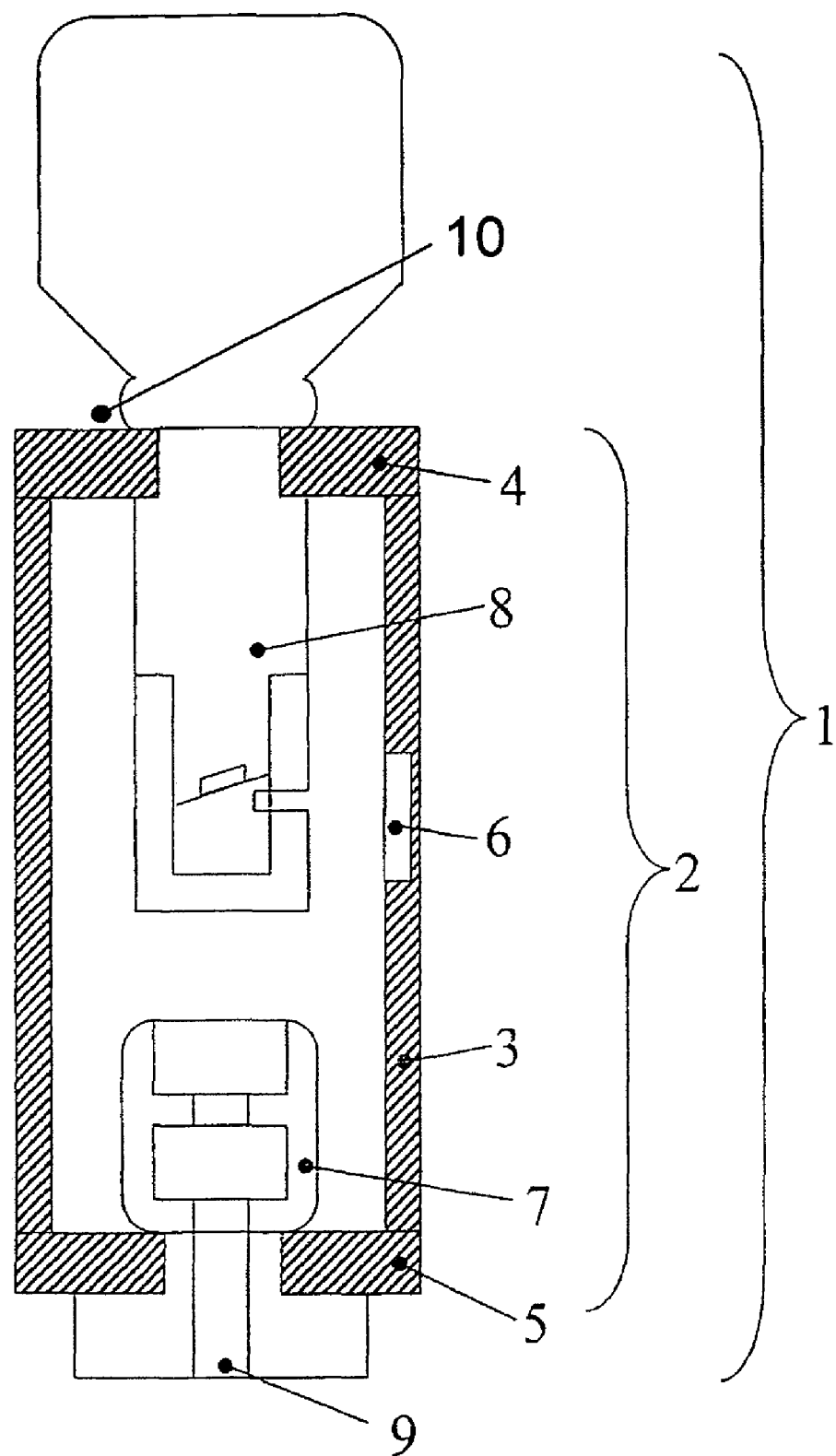

X-RAY GENERATOR AND THE USE THEREOF IN AN X-RAY EXAMINATION DEVICE OR X-RAY INSPECTION DEVICE

This nonprovisional application is a continuation of International Application No. PCT/EP2008/009300, which was filed on Nov. 5, 2008, and which claims priority to German Patent Application No. DE 10 2008 006 620.6, which was filed in Germany on Jan. 29, 2008,and which are both herein incorporated by reference.

BACKGROUND OF THE INVENTION

1. Field of the Invention

The invention relates to an X-ray generator with a tubular housing and components located inside the housing for generating one or more X-ray beams, as well as the use thereof, in particular in an X-ray inspection device for inspection of pieces of luggage or the like.

2. Description of the Background Art

As is known from the conventional art, X-ray generators known as X-ray tubes have at least one anode and at least one cathode, which are located in an evacuated housing. As a rule, the housing is formed of a glass envelope or a metal cylinder that is closed with sealing covers.

An X-ray examination device with an X-ray generator of this design is known from DE 196 08 862 A1, which corresponds to U.S. Pat. No. 5,844,962. An X-ray generator with a glass envelope is used.

DE 198 02 668 A1, which corresponds to U.S. Pat. No. 6,188,747, which is incorporated herein by reference, describes an X-ray generator that has a common anode and two cathodes (dual energy generator), which are likewise housed in a glass envelope.

DE 103 20 700 A1, which corresponds to U.S. Publication No. 20050002491, describes a vacuum housing for an X-ray tube. In order to increase the service life, a specific region of the housing is provided with a protective coating. In this design, the protective coating consists of, among other things, a ceramic high-temperature material that is applied to the wall by plasma spraying.

SUMMARY OF THE INVENTION

It is therefore an object of the present invention to create an X-ray generator that can be manufactured more easily, more economically, and with dimensions that are better reproducible.

This object is attained according to an embodiment of the invention in that the housing of the X-ray generator is composed of a tube body that is made of ceramic.

The ceramic is selected such that it has a certain surface conductivity that is sufficient to prevent charge clusters. The cover and base of the housing preferably are also made of ceramic. They can be attached to the tube body in a simplified and reliable manner through an active solder process.

The necessary exit window for the X-rays can advantageously be worked into the tube body as a thinned ceramic layer, for example by milling. It is thus no longer necessary to introduce a separate window.

The ceramic that is employed should have a low coefficient of thermal expansion, high vacuum tightness, and good surface conductivity. The desired surface conductivity can be achieved through doping the ceramic. A separate step to improve conductivity, for example the application of a conductive coating, is then no longer necessary. An aluminum oxide ceramic has proven to be a suitable ceramic.

As compared to glass, ceramic materials provide the further advantage that dimensional stability is improved with regard to positioning from anode to cathode in all three directions in space. Due to the use of an active solder to join the individual components, the usual process of premetalizing the ceramic in the manufacture of metal or ceramic tubes is considerably simplified. Consequently, manufacture is more economical.

An X-ray generator according to the invention is preferably used in an X-ray examination or inspection device. Preferably, it is employed in X-ray inspection devices for safety inspection of luggage or other objects, for example at airports.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein the sole FIGURE illustrates a section through an inventive X-ray generator.

DETAILED DESCRIPTION

The X-ray generator 1 has a housing 2, which consists of a tube body 3 with an approximately ring-shaped cross-section, a cover 4 and a base 5. Located in the housing 2 are the familiar components for generating one or more X-ray beams. The cathode 7 and the anode 8 are shown in the drawing. The tube body 3, at a minimum, is made of ceramic, for instance an aluminum oxide ceramic. The ceramic is doped if necessary for adequate surface conductivity.

The cover 4 and the base 5 can be made of a suitable ceramic and are joined to the tube body 3 through an active solder process. During this process, the electric supply lines 9 for the cathode 7 and the electrically conductive feedthrough 10 of the anode 8 are attached in a gastight manner in the base 5 or in the cover 4. This attachment is likewise preferably accomplished through an active solder process.

Worked into the tube body 3 as a thinned ceramic layer is an exit window 6 for the X-ray beams. In order to thin the ceramic layer at the exit window 6, ceramic is removed in the corresponding region, for example by milling. Preferably the exit window 6 is worked into the tube body 3 from the inside. The exit window 6 is then located on the inner surface of the tube body 3, as is shown in FIG. 1. This has the advantage that a continuous layer remains on the outside in the tube body 3, which is further away from the anode 8 than it would be if the window 6 were on the outside. Because of the greater distance, the field strength is lower in this region, so that the danger of a breakdown of electrons through the window 6 is reduced.

Preferably the X-ray generator 1 shown in FIG. 1 is used in an X-ray inspection device for safety inspection of luggage or similar objects, for example at airports.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An X-ray generator comprising:
    a housing; and
    components arranged within the housing, the components being configured to generate one or more X-ray beams,
    wherein the housing is formed of a tube body that is made of ceramic,
    wherein an exit window for the X-ray beams is provided in the tube body, and
    wherein a thickness of the tube body at the exit window is smaller than a thickness of the tube body at a location spaced from the exit window.

2. The X-ray generator according to claim 1, wherein the housing comprises a cover and a base that are made of ceramic.

3. The X-ray generator according to claim 2, wherein the tube body is joined to the cover and/or the base by an active solder process.

4. The X-ray generator according to claim 1, wherein the exit window is formed into the tube body on an inner surface of the tube body.

5. The X-ray generator according to claim 1, wherein the ceramic is a doped aluminum oxide ceramic.

6. The X-ray generator according to claim 1, wherein the X-ray generator generates X-rays in an X-ray examination device or X-ray inspection device for safety, inspection of luggage or similar objects.

7. The X-ray generator according to claim 1, wherein a thickness of a cross-section of the exit window is smaller than a thickness of a cross-section of the tube body.

8. The X-ray generator according to claim 1, wherein the exit window comprises a cavity in a wall of the tube body.

9. The X-ray generator according to claim 8, wherein the cavity is located on an interior side of the wall of the tube body.

10. An X-ray generator comprising:
    a housing; and
    components arranged within the housing, the components being configured to generate one or more X-ray beams,
    wherein the housing is formed of a tube body that is made of ceramic, and
    wherein the ceramic is a doped ceramic.

11. A method of manufacturing an X-ray generator, comprising:
    forming a housing comprising a tube body from doped ceramic; and
    arranging components within the housing, the components being configured to generate one or more X-ray beams.

12. The method according to claim 11, further comprising forming a cover and a base for the housing that are made of ceramic.

13. The method according to claim 12, further comprising joining the tube body to the cover and/or the base by an active solder process.

14. The method according to claim 11, further comprising providing an exit window for the one or more X-ray beams in the tube body as a thinned ceramic layer.

15. The method according to claim 14, wherein the exit window is formed into the tube body on an inner surface of the tube body.

16. The method according to claim 11, wherein the doped ceramic is a doped aluminum oxide ceramic.

17. A method of safety inspection using X-rays, comprising:
    generating X-rays using an X-ray generator comprising a housing formed from a tube body made of doped ceramic and components arranged within the housing; and
    inspecting luggage or similar objects for safety using the generated X-rays.

* * * * *